Figure 1:
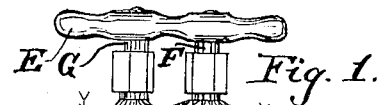

No. 872,043. PATENTED NOV. 26, 1907.
J. C. BECK & J. A. BOWYER.
AIR PUMP.
APPLICATION FILED FEB. 25, 1907.

Witnesses:
A. N. Bogert
C. A. Adams

Inventors:
John C. Beck
and
John A. Bowyer,
By Charles Turner Brown,
Atty.

UNITED STATES PATENT OFFICE.

JOHN C. BECK AND JOHN A. BOWYER, OF CHICAGO, ILLINOIS.

AIR-PUMP.

No. 872,043.          Specification of Letters Patent.          Patented Nov. 26, 1907.

Application filed February 25, 1907. Serial No. 359,197.

To all whom it may concern:

Be it known that we, JOHN C. BECK and JOHN A. BOWYER, citizens of the United States, and residents of Chicago, in the county of Cook and State of Illinois, have invented certain new and useful Improvements in Air-Pumps, of which the following, when taken in connection with the drawing accompanying and forming a part hereof, is a full and complete specification, sufficient to enable those skilled in the art to which it pertains to understand, make, and use the same.

This invention relates to those air pumps which are used to force air into a receptacle against considerable pressure, as into an automobile tire. And the object of our invention is to obtain an air pump by means of which a given quantity or volume of air can be quickly forced into a tire or other receptacle by a person using the device while such person is working the pump at a moderate speed. And a further object of the invention is to obtain a pump of the character named which can be easily operated as described by a person of average strength.

A further object of the invention is to obtain a pump of the character named which can be readily adjusted to fill a tire or other receptacle with air at a given pressure and will then cease to force additional air into such tire or other receptacle and will also give an alarm to attract the attention of the operator.

A further object of the invention is to obtain a pump of the character described which is economical in construction, sightly in appearance and not readily gotten out of repair.

Figure 2:
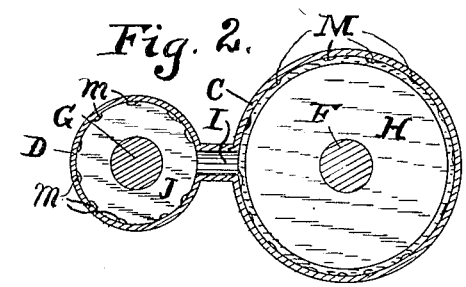
Figure 3:
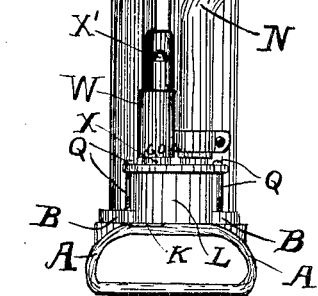
Figure 5:
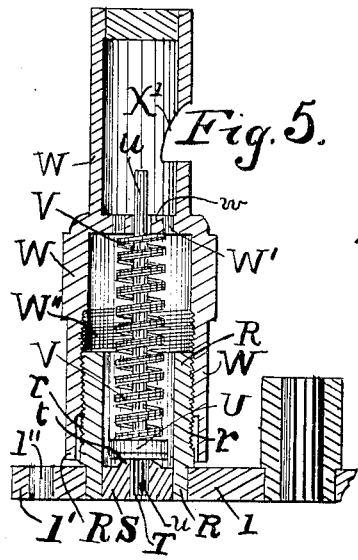
Figure 4:
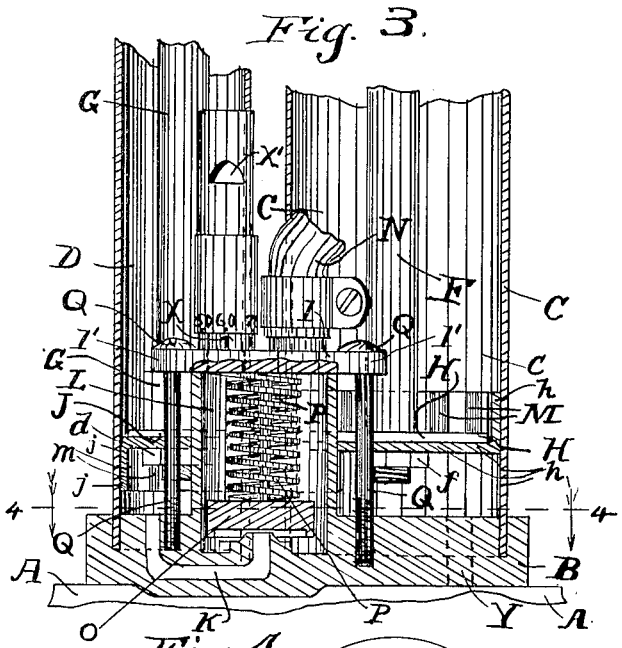
Figure 4:
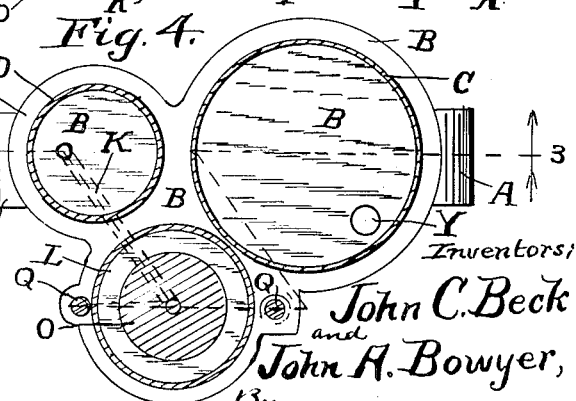

In the drawing referred to Figure 1 is an elevation of an air pump embodying our invention. Fig. 2 is a horizontal sectional view of an air pump embodying our invention, on line 2—2 of Fig. 1, viewed in the direction indicated by the arrows. Fig. 3 is a vertical section on line 3—3 of Fig. 4, viewed in the direction indicated by the arrows. Fig. 4 is a horizontal section on line 4—4 of Fig. 3, viewed in the direction indicated by the arrows, and Fig. 5 is a vertical section of the alarm and adjustable air pressure controller of the device, on an enlarged scale.

A reference letter applied to designate a given part is used to indicate such part throughout the several figures of the drawing, wherever the same appears.

A, B is the base of the pump, preferably made so that the foot of the operator may be inserted therein in the usual way.

C is the larger one of the two air cylinders of the pump and D is the smaller one of such cylinders.

E is the handle by which the pump is operated. F is the piston rod of cylinder C and G is the piston rod of cylinder D. Piston rods F and G are both secured in handle E.

H is the piston head in cylinder C secured to the lower end of piston rod F, as by nut $f$ and $h$ is the ordinary leather or packing on piston head H and is so placed that as the piston rod F is raised air in the cylinder above the piston head is compressed above such piston head and forced from such cylinder through passage way I into the smaller cylinder D, and J is the piston head on piston rod G secured in place by the nut $d$.

$j$ is the ordinary leather or packing on piston head J arranged so that as the piston rod G is moved downward the air in cylinder D below such piston head J is compressed and forced through passage K in part B of the base into chamber L.

As is well known in the art when the leather or packing ($h$, $j$) of a piston head is arranged to force air ahead of it when the piston rod is moved in one direction, upon the movement of the piston rod in the opposite direction passage ways (M, $m$) will be formed between the leather of the piston head and the cylindrical wall of the cylinder in which it is placed, and through such passage ways air will be forced by atmospheric pressure into the chamber in the cylinder which is being enlarged by such movement of the piston rod. Because of such fact, when the handle E and piston rods F and G are raised from the position of such piston rods in Fig. 3 the air in cylinders C and D above the piston heads H and J will be compressed and if such handle E and rods F and G are raised until the piston heads H and J are substantially at the upper end of the cylinders C and D, all the air above such piston heads will be forced below piston head J in cylinder D, and if, as we prefer, the cylinder C contains twice as much air as cylinder D, when piston heads H and J are down, (say in the position thereof illustrated in Fig. 3) when such piston heads are at the upper end of the cylinders the pressure of the air in cylinder D below piston head J will approximate three atmospheres and as the piston head J is forced down such air under pressure of about three atmospheres will be forced, as hereinbefore stated, through passage way K in chamber L and from thence through flexible tube N into the receptacle designed to contain such air, at a pressure determined by mechanism forming a part of this pump and about to be described.

To prevent air in chamber L flowing back therefrom through passage way K into the cylinder D as the piston head J is raised we provide the valve seat $k$, at the end of such passage way and valve O co-acting therewith, with spring P yieldingly holding the valve O to its seat.

To lessen the cost of the construction of the pump embodying our invention we prefer to make the cylindrical walls of the chamber K integral with part B of the base A, B, and to provide head $l$ having ears $l'$, $l'$ thereon with holes $l''$, $l''$, through which the screw bolts Q, Q, extend with the screw threaded portion of such bolts engaging with like screw threads in part B of the base. The head $l$ can in this manner be secured in place so that no air will flow from chamber L between the upper end of the cylinderical walls thereof and such head.

To control the pressure in the receptacle into which air is forced from chamber L we provide a combined alarm and relief valve. This relief valve is shown in section in Fig. 5 of the drawing and comprises the tube R with screw threads $r$ thereon, secured in head $l$, bottom S in such tube, such bottom provided with passage way T, having valve seat $t$ at the upper end thereof, the valve U on stem $u$, such valve co-acting with the valve seat $t$, spring V yieldingly holding valve U on seat $t$, and cap W provided with the partition $w$ having passage ways $w'$ thereon and with screw threads $w''$ engaging the corresponding screw threads on tube R. The pressure of the spring V on valve U is varied by the turning of the cap W on tube R thus raising or lowering the partition $w$. The pressure of air which may be obtained in chamber L before the valve U will be forced from its seat is preferably indicated by numbers on cap W (see Figs. 1 and 3) and an arrow or other mark X on tube R.

X' is a signal, which may be an ordinary whistle in the upper end of cap W.

By the use of the relief valve and signal when a pneumatic tire for a vehicle is to be inflated by the use of this pump not only is over inflation of the tire impossible, and full inflation obtainable, but in addition thereto an alarm or signal is given to the person operating the pump.

Y is the inlet to cylinder C.

Having thus described our invention what we claim is new and desire to secure by Letters Patent is;—

1. In an air pump, the combination of a cylinder provided with a piston, a chamber, a base common to the cylinder and chamber, such base provided with a passage way communicating with the cylinder and with the chamber, means to prevent the flow of air through such passage way from the chamber to the cylinder, and such chamber provided with a discharge passage way, and adjustable mechanism to divert the discharge of air in the chamber from the discharge passage way when a desired maximum pressure of air is flowing through such chamber; substantially as described.

2. In an air pump, the combination of a plurality of cylinders respectively provided with pistons, a communicating passage way between the cylinders, a chamber, a base common to the cylinders and chamber, such base provided with a passage way communicating with one of the cylinders and with the chamber, means to prevent the flow of air through such passage way from the chamber to the cylinder, and such chamber provided with a discharge passage way, and adjustable mechanism to divert the discharge of air in the chamber from the discharge passage way when a desired maximum pressure of air is flowing through such discharge passage way; substantially as described.

3. In an air pump, the combination of cylinders of equal length and different diameters, a communicating passage way between the cylinders adjacent to the upper end thereof, a chamber, a communicating passage way between the small cylinder and the chamber, a valve seat at the discharge end of the passage way and a valve in the chamber to co-act with the valve seat, a spring in the chamber to yieldingly hold the valve on the seat, piston rods in the cylinders, a handle common to the piston rods, such piston rods respectively provided with piston heads arranged so that when the piston rods are raised the air above the piston heads in both cylinders is forced below the piston head in the smaller cylinder and when the piston rods are depressed the air below the piston head in the smaller cylinder is forced into the chamber and air at atmospheric pressure may enter both cylinders above the downward moving piston heads, an air discharge tube from the chamber and a combined relief and signal device in communication with the chamber; substantially as described.

JOHN C. BECK.
JOHN A. BOWYER.

In the presence of—
CHARLES TURNER BROWN,
CORA ADAMS.